United States Patent [19]
Hoshino

[11] Patent Number: 5,482,228
[45] Date of Patent: Jan. 9, 1996

[54] LANDING GEAR ASSEMBLY FOR AIRPLANE

[75] Inventor: Takaaki Hoshino, Tokyo, Japan

[73] Assignee: Honda Giken Kogyo Kabushiki Kaisha, Tokyo, Japan

[21] Appl. No.: 131,705

[22] Filed: Oct. 5, 1993

[30] Foreign Application Priority Data

Oct. 5, 1992 [JP] Japan ..................... 4-290757

[51] Int. Cl.$^6$ ................................. B64C 25/10
[52] U.S. Cl. ................. 244/50; 244/102 R; 244/102 A
[58] Field of Search .................. 244/102 R, 102 A, 244/102 SL, 50

[56] References Cited

U.S. PATENT DOCUMENTS

| | | | |
|---|---|---|---|
| 2,371,699 | 3/1945 | Martin | 244/102 A |
| 3,054,579 | 9/1962 | Bary | 244/102 R |
| 3,904,153 | 9/1975 | Watts | 244/102 SL |
| 4,228,975 | 10/1980 | Sealey | 244/102 R |
| 5,029,775 | 7/1991 | Abramovitsh | 244/102 R |
| 5,100,083 | 3/1992 | Large et al. | 244/102 R X |

FOREIGN PATENT DOCUMENTS

| | | | |
|---|---|---|---|
| 506633 | 5/1939 | United Kingdom | 244/102 R |
| 508211 | 6/1939 | United Kingdom | 244/102 R |

*Primary Examiner*—William Grant
*Attorney, Agent, or Firm*—Lyon & Lyon

[57] ABSTRACT

A nose landing gear assembly on an airplane with a front fuselage section having a wheel bay defined therein and a pair of laterally spaced side compartments defined therein on each side of the wheel bay by respective laterally spaced side walls. A nose landing gear is mounted on the fuselage section for pivotal lifting and lowering movement into and out of the wheel bay. The nose landing gear assembly includes an actuator disposed in one of the side compartments for lifting the nose landing gear into and lowering the nose landing gear out of the wheel bay, and a steering device disposed in the other of the side compartments for steering the nose landing gear while the airplane is taxiing. Since the actuator and the steering device are concealed in the respective side compartments, they are protected from foreign-object damage. The nose landing gear assembly allows the airplane cabin to have increased space because the actuator and the steering device are positioned laterally of the nose landing gear.

24 Claims, 4 Drawing Sheets

LANDING GEAR ASSEMBLY FOR AIRPLANE

BACKGROUND OF THE INVENTION

1. Field of the Invention

The present invention relates to a landing gear assembly for an airplane and, in particular, to a landing gear assembly that maintains the desired cabin space and prevents foreign-object damage (FOD) while the airplane is taxiing.

2. Description of the Related Art

Nose landing gear assemblies that are retractable into the fuselage of an airplane include an actuator for lifting and lowering the nose landing gear and a steering device for steering the airplane during taxiing, the actuator and the steering device being disposed around the nose landing gear. The actuator is generally located below the floor of the airplane cabin. The steering device includes a steering mechanism such as a steering cable coupled to the nose landing gear, and the steering mechanism is generally positioned in the vicinity of the central axis of the fuselage.

However, the conventional position of the actuator and the steering device has not been optimum from the standpoint of maximizing the space in the aircraft cabin for better comfort. More specifically, the actuator positioned below the floor of the cabin has been an obstacle to efforts to lower the cabin floor, and hence has limited the vertical dimension of the cabin space. The location of the steering mechanism in the vicinity of the central axis of the fuselage has posed a limitation on the longitudinal dimension of the cabin especially in the case where the airplane is of the type in which the cabin is a pressurized cabin with a spherical pressure bulkhead. Since the spherical pressure bulkhead usually has its spherical wall positioned on the central axis of the fuselage, the spherical wall tends to interfere with the steering device if the cabin were to extend forward.

The location of the steering mechanism in the vicinity of the central axis of the fuselage has also been disadvantageous in that the space for the steering cable coupled to the nose landing gear is limited vertically.

When the actuator and the steering device are positioned on the central axis of the fuselage in the wheel bay of the landing gear, they are exposed to the external space and hence subject to FOD due to stones or other foreign matter during taxiing, taking-off and landing when the nose landing gear is lowered.

SUMMARY OF THE INVENTION

It is therefore an object of the present invention to provide a landing gear assembly for use in an airplane, which allows the airplane to have increased cabin space for greater cabin comfort.

Another object of the present invention is to provide a landing gear assembly for use in an airplane, which assembly includes an actuator and a steering device protected from FOD for higher reliability by side walls positioned on each side of a wheel bay.

Still another object of the present invention is to provide a landing gear assembly for use in an airplane, which assembly includes a steering device having components coupled to each other at a position selected for greater leeway.

According to the present invention, there is provided a landing gear assembly on an airplane, comprising a fuselage having a wheel bay defined therein and a pair of laterally spaced side walls on each side of the wheel bay, a landing gear mounted on the fuselage, an actuator disposed laterally outwardly of one of the side walls for lifting the landing gear into and lowering the landing gear out of the wheel bay, and a steering device disposed laterally outwardly of the other of the side walls for steering the landing gear during taxiing of the airplane.

According to the present invention, there is also provided a landing gear assembly on an airplane, comprising a fuselage section defining therein a wheel bay and a pair of laterally spaced side compartments on each side of the wheel bay, a landing gear mounted on the fuselage section for pivotal movement into and out of the wheel bay, an actuator disposed in one of the side compartments for lifting the landing gear into and lowering the landing gear out of the wheel bay, and a steering device disposed in the other of the side compartments for steering the landing gearing during taxiing of the airplane.

According to the present invention, there is further provided a nose landing gear assembly on an airplane, comprising a front fuselage section having a wheel bay defined therein and a pair of laterally spaced side compartments defined therein on each side of the wheel bay by respective laterally spaced side walls, a nose landing gear mounted on the fuselage section for pivotal lifting and lowering movement into and out of the wheel bay, an actuator disposed in one of the side compartments for lifting the nose landing gear into and lowering the nose landing gear out of the wheel bay, and a steering device disposed in the other of the side compartments for steering the nose landing gear while the airplane is taxiing.

The above and other objects, features and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

The landing gear arrangement for an airplane according to the present invention normally comprises two main landing gears (not shown) positioned substantially lengthwise and on either side of the fuselage of the airplane and a single nose landing gear positioned on a front portion of the fuselage. These three landing gears are retractable into the fuselage during flight.

Figure 1:
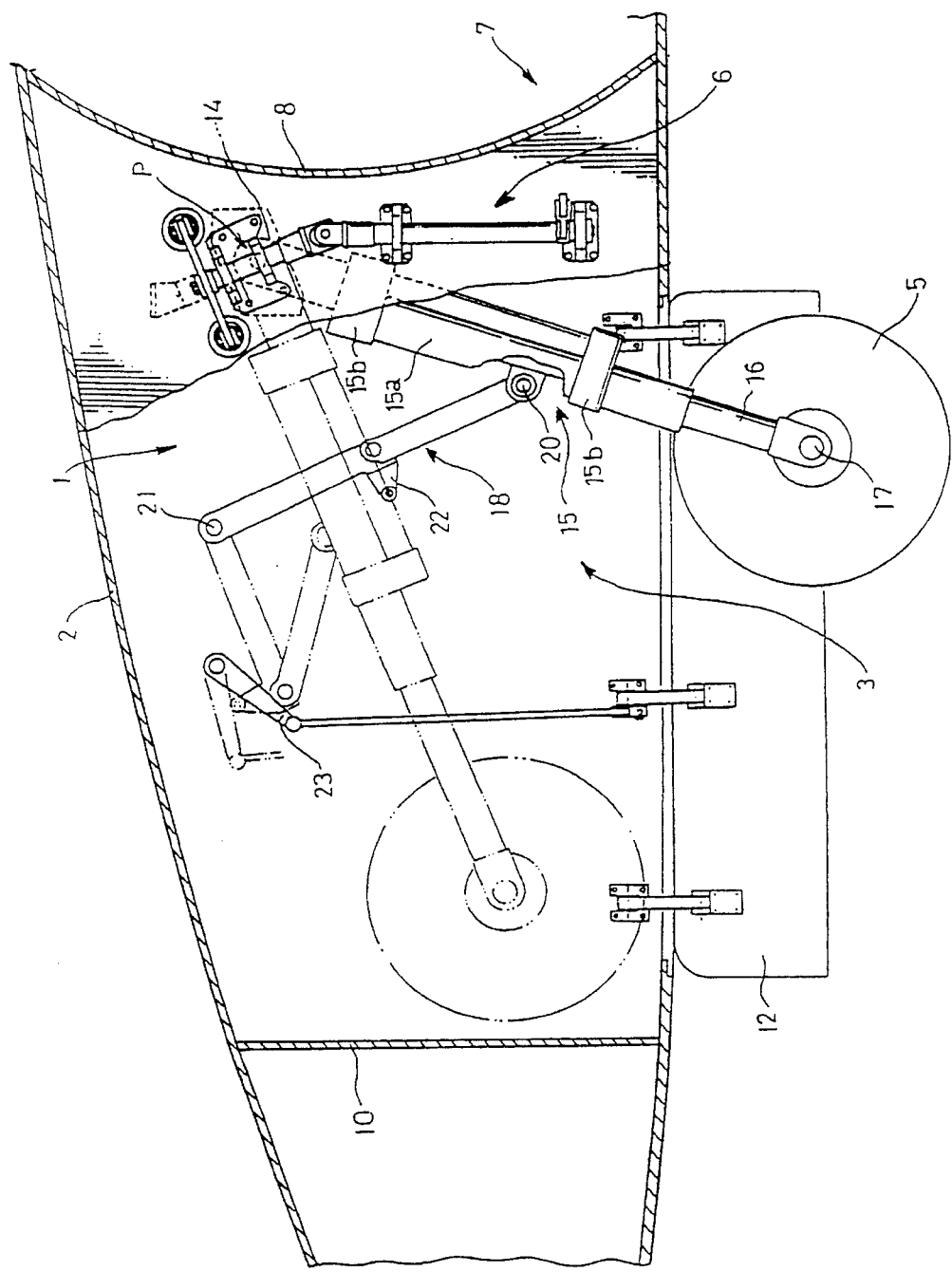
FIG. 1 is a side elevational view of a nose landing gear assembly for an airplane according to the present invention.
Figure 2:
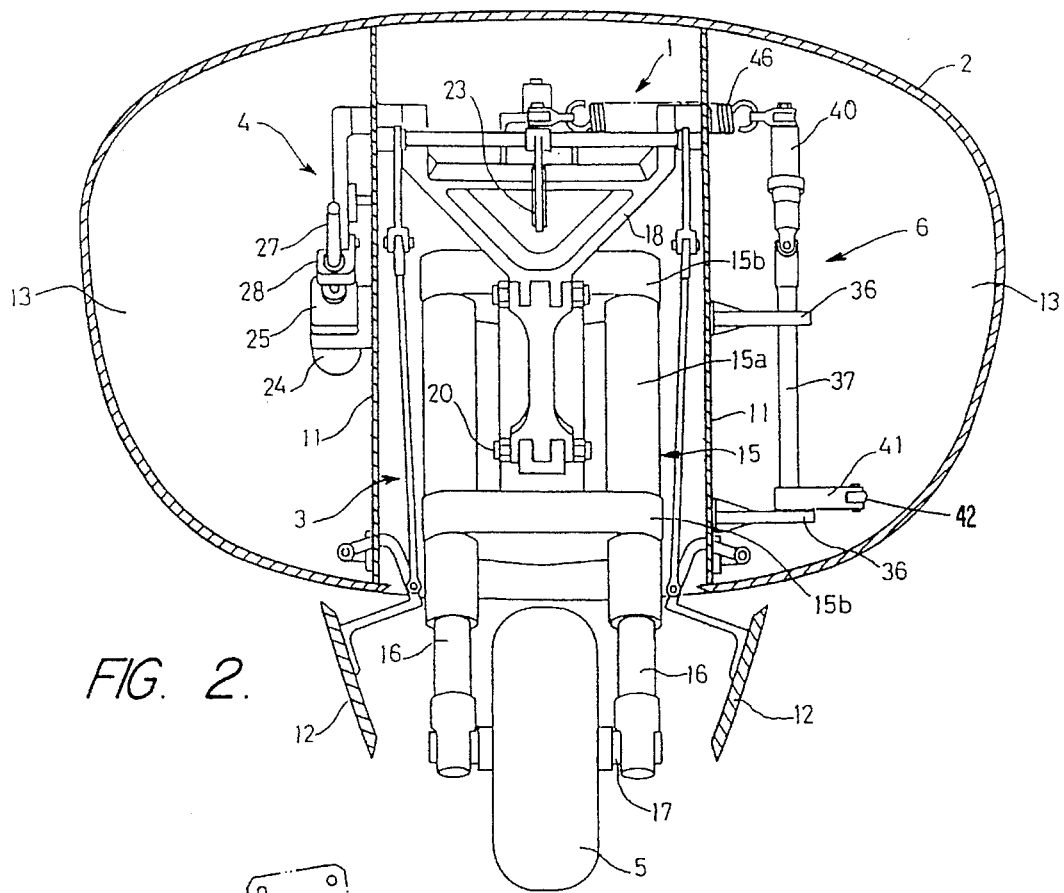
FIG. 2 is a front elevational view of the nose landing gear assembly shown in FIG. 1.

As shown in FIGS. 1 and 2, a front portion 2 of the fuselage has a wheel bay 3 for storing a nose landing gear 1. An actuator 4 for lifting and lowering the nose landing gear 1 and a steering device 6 for steering a nose landing wheel 5 while the airplane is taxiing are positioned on either side of the wheel bay 3 around the nose landing gear 1.

As shown in FIG. 1, the wheel bay 3 is located in front of a spherical pressure bulkhead 8 that also defines the front end of a pressurized cabin 7 in the fuselage. Specifically, the wheel bay 3 is defined as a space surrounded by a front vertical bulkhead 10 in a front portion of the fuselage, a pair of laterally spaced vertical side walls 11 (see FIG. 2) positioned one on each side of the nose landing gear 1, and the pressure bulkhead 8. After the nose landing gear 1 is lifted forward into the wheel bay 3 as indicated by the two-dot-and-dash lines in FIG. 1, the lower opening of the wheel bay 3 is closed by a pair of lateral doors 12 (see FIG. 2).

As shown in FIG. 2, the front fuselage portion 2 also has a pair of laterally spaced side compartments 13 defined on each side by an outwardly curved portion of the fuselage and the side wall 11 on that side of the wheel bay 3.

As shown in FIGS. 1 and 2, the nose landing gear 1 comprises a base shaft 14 pivotally attached at its upper end to the fuselage for swinging movement about a pivot axis P, a strut guide 15 angularly movable about a downward extension of the base shaft 14, and a pair of laterally spaced struts 16 supported on the strut guide 15. The nose landing wheel 5 is rotatably supported between the struts 16 by a wheel shaft 17 mounted on the lower ends of the struts 16. The strut guide 15 comprises a pair of laterally spaced damping cylinders 15a supporting the respective struts 16 on their lower ends, and a pair of vertically spaced couplings 15b interconnecting the damping cylinders 15a at their upper and lower ends. The upper coupling 15b is connected to the lower end of the base shaft 14.

The lower end of a centrally foldable drag brace 18 is pivotally attached to an intermediate portion of the downward extension of the base shaft 14 for swinging movement about a pin 20. The drag brace 18 has an upper end fixed to a pivot shaft 21 (described later on) which is coupled to the actuator 4, thus connecting the nose landing gear 1 to the actuator 4. Drive forces from the actuator 4 are transmitted through the pivot shaft 21 to the drag brace 18, which lifts or lowers the nose landing gear 1. The centrally foldable drag brace 18 has an engaging member 22 in its central folding region. When the nose landing gear 1 is lifted, the engaging member 22 engages and elevates a door lifter 23 connected to the doors 12, thereby closing the doors 12.

The strut guide 15 is coupled to the steering device 6, and swingable about the base shaft 14 for steering the nose landing wheel 5 of the nose landing gear 1.

As shown in FIG. 2, the actuator 4 and the steering device 6 are positioned in the respective side compartments 13 in sandwiching relationship to the nose landing gear 1.

The actuator 4, positioned in one of the side compartments 13, for lifting and lowering the nose landing gear 1 will be described below with reference to FIGS. 3 and 4.

Figure 3:
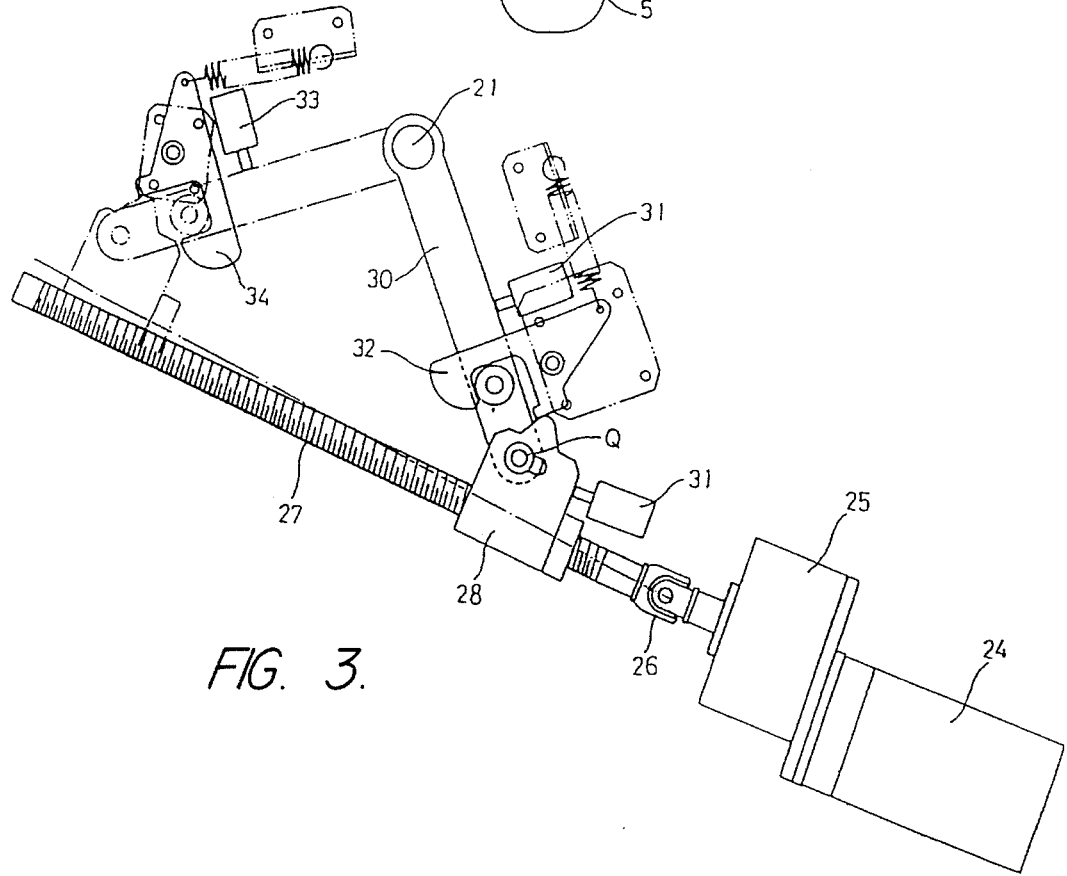
FIG. 3 is a side elevational view of an actuator of the nose landing gear assembly.
Figure 4:
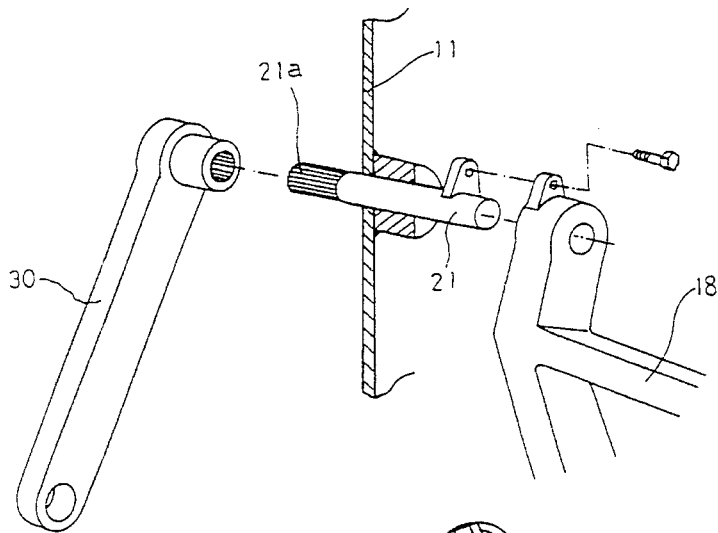
FIG. 4 is a perspective view showing the manner in which the actuator and a drag brace are coupled to each other.

In FIG. 3, the actuator 4 is shown as being viewed in side elevation from the side wall 11. FIG. 4 shows the manner in which the actuator 4 and the drag brace 18 are connected to each other.

The actuator 4 comprises a motor 24 attached to the side wall 11, a gearbox 25 mounted on the motor 24, and a jack screw 27 connected to the output shaft of the gearbox 25 through a universal joint 26. A nut holder 28 is threaded over the jack screw 27.

To the nut holder 28, there is pivotally connected the lower end of a retractor arm 30 by a pivot shaft Q. The upper end of the retractor arm 30 is coupled to the pivot shaft 21 through splines 21a on the pivot shaft 21, as shown in FIG. 4. The pivot shaft 21 extends rotatably through the side wall 11 and is fastened to the drag brace 18 by a bolt.

When the motor 24 is energized, the jack screw 27 is rotated about its own axis by the gearbox 25, causing the nut holder 28 to move along the jack screw 27. The retractor arm 30 is angularly moved, swinging the drag brace 18 about the pivot shaft 21, i.e., lifting or lowering the nose landing gear 1. The universal joint 26 coupled between the output shaft of the gearbox 25 and the jack screw 27 allows the jack screw 27 to swing as the pivot shaft Q between the retractor arm 30 and the nut holder 28 moves arcuately about the pivot shaft 21, thereby permitting the nut holder 28 to move smoothly along the jack screw 27. The nut holder 28 would not move smoothly if the jack screw 27 were fixed against swinging movement.

One or more down limit switches 31 are provided for coaction with the retractor arm 30 and the nut holder 28 for detecting the down position as indicated by the solid lines in FIG. 3, of the retractor arm 30 when the nose landing gear 1 is lowered. The retractor arm 30 can be locked by a down lock hook 32 when it is in the solid-line position. An up limit switch 33 is provided for coaction with the retractor arm 30 for detecting the up position, as indicated by the dot-and-dash lines in FIG. 3, of the retractor arm 30 when the nose landing gear 1 is elevated or retracted. The retractor arm 30 can be locked by an up lock hook 34 when it is in the dot-and-dash-line position. The lock hooks 32 and 34 can be released by any conventional means (not shown) when opposite pivoting of the retractor arm 30 for raising or lowering, respectively, of the landing gear 1 is desired.

Figure 5:
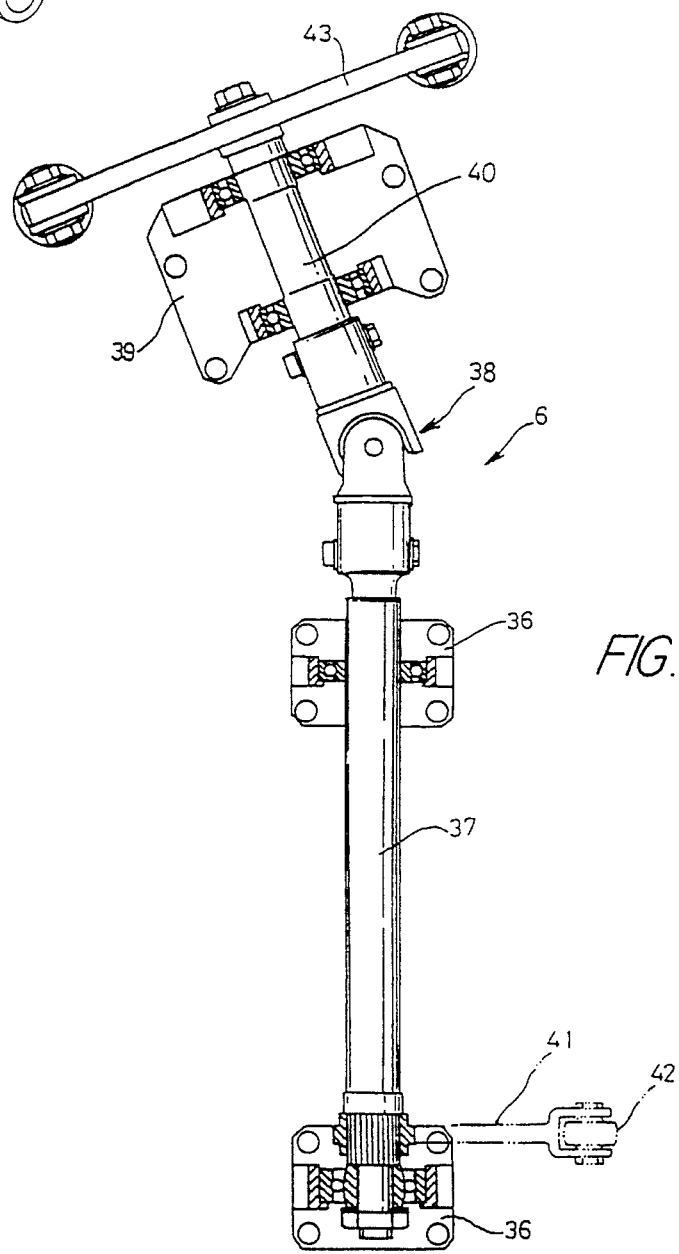
FIG. 5 is a side elevational view of a steering device of the nose landing gear assembly.
Figure 6:
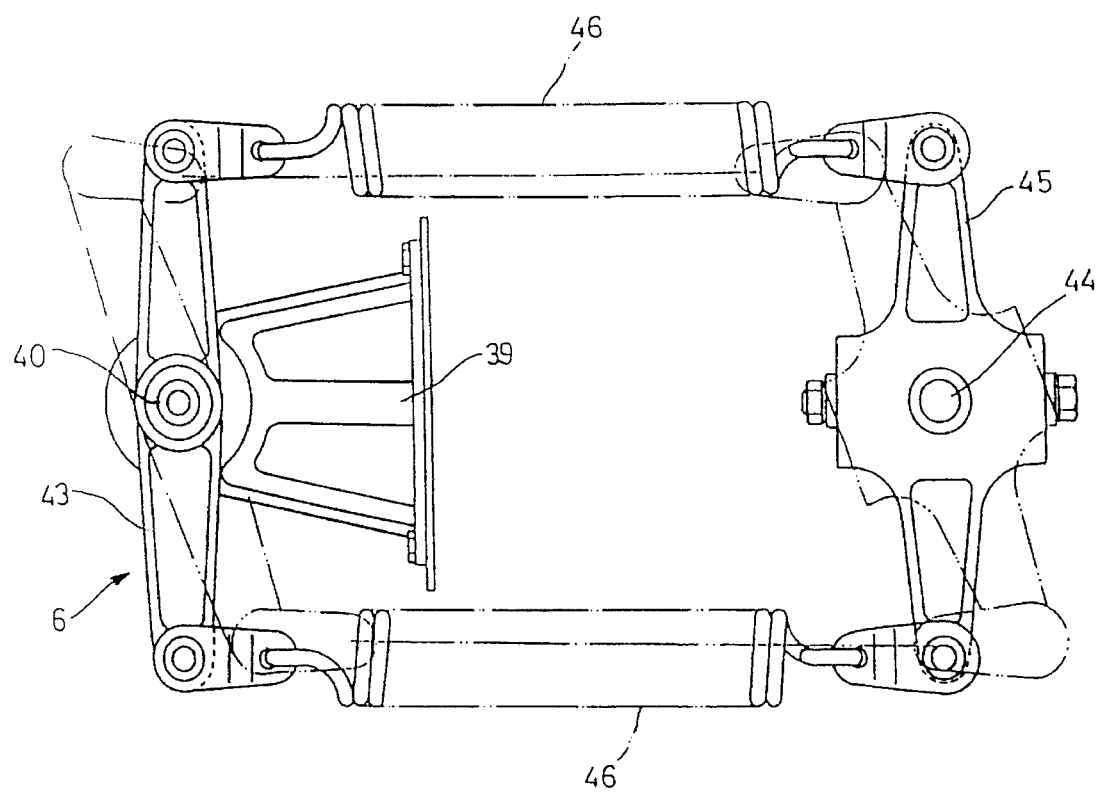
FIG. 6 is a plan view of the steering device.

The steering device 6, which is positioned in the other side compartment 13, will be described below with reference to FIGS. 5 and 6. The steering device 6 is shown as viewed in side elevation and plan, respectively, in FIGS. 5 and 6.

The steering device 6 comprises a plurality of bearings 36 attached to the side wall 11, a substantially vertical steering shaft 37 rotatably supported by the bearings 36, and a joint shaft 40 coupled through a universal joint 38 to the upper end of the steering shaft 37 and rotatably supported by a bearing 39 attached to the side wall 11. An arm 41 which extends laterally from the axis of the fuselage (see FIG. 2) is connected to a lower end portion of the steering shaft 37. A steering cable (not shown) of the push-pull type is connected to the distal end of the arm 41 by a joint 42. For illustration purposes, the arm 41 is shown in dot-and-dash lines extending to the right in FIG. 5, which is the position of arm 41 during steering to turn the airplane, and the arm 41 extends perpendicular to the sheet of FIG. 5 when the wheel 5 is oriented to steer the airplane straight forward.

The steering cable is connected to a pair of ladder pedals (not shown) in a cockpit that is located behind the nose landing gear assembly. When the ladder pedals are pressed, the steering shaft 37 and the joint shaft 40 are rotated about their respective axes.

A bell crank 43 which extends longitudinally in the general direction of the axis of the fuselage is mounted on the upper end of the joint shaft 40. As shown in FIG. 6, a steering bell crank 45 which also extends longitudinally in the general direction of the axis of the fuselage is mounted on a rotatable shaft 44 that is positioned on the axis of the fuselage and is coupled to the strut guide 15. These bell cranks 43, 45 have laterally extending arms that are interconnected by a pair of spaced steering springs 46 in the form of tension coil springs.

When the steering shaft 37 and the joint shaft 40 are rotated by pressing the ladder pedals, the bell crank 45 is turned about the axis of the joint shaft 40, causing the steering springs 46 to turn the steering bell crank 45. Therefore, the rotatable shaft 44 and the strut guide 15 are angularly moved, thereby turning the nose landing gear 1 to steer the airplane.

When the ladder pedals are released, they return to the neutral positions and the nose landing gear 1 is returned to its neutral steering position under the bias of the steering springs 46.

In conventional steering devices, the steering shaft 37 has been positioned in place of the rotatable shaft 44 on the axis of the fuselage. However, since the steering cable has been required to be connected to the steering shaft as high as the steering bell crank 45, insufficient leeway has been available with respect to the position where the steering cable is connected to the steering shaft.

Inasmuch as the spherical pressure bulkhead 8 in front of the cabin 7 has its spherically projecting wall located near the region where the nose landing gear 1 is installed on the axis of the fuselage, the conventional steering devices have posed a limitation on the cabin space because of the necessity of avoiding physical interference with surrounding members.

Operation of the nose landing gear assembly will be described below.

To lift and lower the nose landing gear 1 with the actuator 4, the motor 24 is energized to rotate the jack screw 27. The components of the actuator 4, i.e., the motor 24, the gearbox 25, the jack screw 27, and other associated parts, are disposed outside of the wheel bay 3, i.e., in one of the side compartments 13. Consequently, they are not exposed to the external space and ground when the nose landing gear 1 is lowered.

The actuator 4 that is concealed in the side compartment 13 is prevented from being damaged by flying stones and other debris during taxiing or from colliding with birds immediately before landing or after take-off with the nose landing gear 1 lowered. Therefore, the nose landing gear 1 can be lifted and lowered with higher reliably by the actuator 4. Because the actuator 4 is positioned laterally of the nose landing gear 1, the cabin 7 may be extended forwardly and hence may have increased space.

The nose landing wheel 5 is steered by rotating the steering shaft 37 of the steering device 6. Because the steering device 6 is positioned laterally of the nose landing gear 4, i.e., in the other side compartment 13, the steering device 6 is protected from FOD and allows the cabin 7 to have increased space. In addition, the steering cable may be coupled to the steering shaft 37 at a position selected with greater leeway because the position of the arm 41 may be selected relatively freely.

The actuator 4 disposed in one of the side compartments 13 and the steering device 6 in the other side compartment 13 are effective in keeping the weight of the fuselage in equilibrium or a state of balance in the lateral direction.

Although a certain preferred embodiment of the present invention has been shown and described in detail, it should be understood that various changes and modifications may be made therein without departing from the scope of the appended claims.

What is claimed is:

1. A landing gear assembly on an airplane, comprising:
   a fuselage having a wheel bay defined therein and a pair of laterally spaced side walls on each side of said wheel bay;
   a landing gear mounted on the fuselage;
   an actuator disposed laterally outwardly of one of said side walls for lifting said landing gear into and lowering said landing gear out of said wheel bay; and
   a steering device disposed laterally outwardly of the other of said side walls for steering said landing gear during taxiing of the airplane.

2. A landing gear assembly according to claim 1, wherein said fuselage has a pair of laterally spaced side compartments defined by said side walls, respectively, on each side of said wheel bay, said actuator and said steering devices being disposed in said side compartments, respectively.

3. A landing gear assembly according to claim 1, wherein said actuator comprises a motor mounted on said one of the side walls, a gearbox coupled to said motor, a jack screw connected to said gearbox, a nut holder threaded over said jack screw, and a retractor arm operatively coupled to said nut holder and said landing gear.

4. A landing gear assembly according to claim 3, wherein said actuator further comprises first sensor means operable in coaction with said retractor arm for detecting a lowered position of said landing gear, first locking means for locking said landing gear in said lowered position, second sensor means operable in coaction with said retractor arm for detecting a lifted position of said landing gear, and second locking means for locking said landing gear in said lifted position.

5. A landing gear assembly according to claim 1, wherein said steering device comprises a steering shaft means rotatably mounted on said other of the side walls for rotation in response to a steering action, a first bell crank coupled to said steering shaft means for rotation therewith, a second bell crank coupled to said landing gear assembly for rotation therewith, and spring means interconnecting said first and second bell cranks for transmitting rotation from said first bell crank to said second bell crank.

6. A landing gear assembly according to claim 5, wherein said spring means comprises a pair of springs interconnecting arms of said first and second bell cranks for normally urging said landing gear assembly to a neutral steering position.

7. A landing gear assembly according to claim 1, wherein said landing gear comprises a nose landing gear.

8. A landing gear assembly on an airplane, comprising:
   a fuselage section defining therein a wheel bay and a pair of laterally spaced side compartments on each side of said wheel bay;
   a landing gear mounted on said fuselage section for pivotal movement into and out of said wheel bay;
   an actuator disposed in one of said side compartments for lifting said landing gear into and lowering said landing gear out of said wheel bay; and
   a steering device disposed in the other of said side compartments for steering said landing gear during taxiing of the airplane.

9. A landing gear assembly according to claim 8, wherein said fuselage section has a pair of laterally spaced side walls defining said wheel bay and said side compartments, respectively, on each of outer sides of said side walls of said wheel bay.

10. A landing gear assembly according to claim 9, wherein said actuator comprises a motor mounted in said one side compartment on one of the side walls, a gearbox coupled to said motor, a jack screw connected to said gearbox, a nut holder threaded over said jack screw, and a retractor arm operatively coupled to said nut holder and said landing gear.

11. A landing gear assembly according to claim 10, wherein said actuator further comprises first sensor means operable in coaction with said retractor arm for detecting a lowered position of said landing gear, first locking means for locking said landing gear in said lowered position, second sensor means operable in coaction with said retractor arm for detecting a lifted position of said landing gear, and second locking means for locking said landing gear in said lifted position.

12. A landing gear assembly according to claim 9, wherein said steering device comprises a steering shaft means rotatably mounted in said other side compartment on one of the side walls for rotation in response to a steering action, a first bell crank coupled to said steering shaft means for rotation therewith, a second bell crank coupled to said landing gear for rotation therewith, and spring means interconnecting said first and second bell cranks for transmitting rotation from said first bell crank to said second bell crank.

13. A landing gear assembly according to claim 12, wherein said spring means comprises a pair of springs interconnecting arms of said first and second bell cranks for normally urging said landing gear to a neutral steering position.

14. A landing gear assembly according to claim 8, wherein said landing gear comprises a nose landing gear.

15. A nose landing gear assembly on an airplane, comprising:
    a front fuselage section having a wheel bay defined therein and a pair of laterally spaced side compartments defined therein on each side of said wheel bay by respective laterally spaced side walls;
    a nose landing gear mounted on said fuselage section for pivotal lifting and lowering movement into and out of said wheel bay;
    an actuator disposed in one of said side compartments for lifting said nose landing gear into and lowering said nose landing gear out of said wheel bay; and
    a steering device disposed in the other of said side compartments for steering said nose landing gear while said airplane is taxiing.

16. A nose landing gear assembly according to claim 15, wherein said front fuselage section has a pressure bulkhead positioned behind said wheel bay and said side compartments.

17. A nose landing gear assembly according to claim 15, wherein said actuator comprises a motor mounted in said one side compartment on one of the side walls, a gearbox coupled to said motor, a jack screw connected to said gearbox, a nut holder threaded over said jack screw, and a retractor arm operatively coupled to said nut holder and said nose landing gear.

18. A nose landing gear assembly according to claim 17, wherein said actuator further comprises a first limit switch operable in coaction with said retractor arm for detecting a lowered position of said nose landing gear, a first lock hook for locking said nose landing gear in said lowered position, a second limit switch operable in coaction with said retractor arm for detecting a lifted position of said nose landing gear, and a second lock hook for locking said nose landing gear in said lifted position.

19. A nose landing gear assembly according to claim 15, wherein said steering device comprises a steering shaft means rotatably mounted in said other side compartment on one of the side walls for rotation in response to a steering action, a first bell crank coupled to said steering shaft means for rotation therewith, a second bell crank coupled to said nose landing gear for rotation therewith, and spring means interconnecting said first and second bell cranks for transmitting rotation from said first bell crank to said second bell crank.

20. A landing gear assembly according to claim 19, wherein said spring means comprises a pair of springs interconnecting arms of said first and second bell cranks for normally urging said nose landing gear to a neutral steering position.

21. A nose landing gear assembly on an airplane having a front fuselage section with a wheel bay therein and a nose landing gear mounted in the fuselage section for pivotal lifting and lowering movement into and out of the wheel bay, an improvement comprising,
    a pair of laterally spaced side compartments defined in the front fuselage section on each side of the wheel bay by respective laterally spaced side walls;
    an actuator disposed in one of said side compartments for lifting said nose landing gear into and lowering said nose landing gear out of said wheel bay; and
    a steering device disposed in the other of said side compartments for steering said nose landing gear while said airplane is taxiing.

22. A nose landing gear assembly according to claim 21, wherein said actuator comprises a driving means mounted on one of the side walls and a retractor means operatively coupled between said driving means and said nose landing gear.

23. A nose landing gear assembly according to claim 22, wherein said steering device comprises a steering shaft means rotatably mounted on the other of said side walls for rotation in response to a steering action and means for transmitting rotation from said steering shaft means to said nose landing gear.

24. A nose landing gear assembly according to claim 21, wherein said steering device comprises a steering shaft means rotatably mounted on one of said side walls for rotation in response to a steering action, and means for transmitting rotation from said steering shaft means to said nose landing gear.

* * * * *